July 29, 1969 J. L. EVANS 3,457,793

PNEUMATIC CAGING

Filed May 24, 1967

INVENTOR.
JOHN L. EVANS

BY
Constantine A. Michalos
ATTORNEY

United States Patent Office 3,457,793
Patented July 29, 1969

3,457,793
PNEUMATIC CAGING
John L. Evans, Oakland, N.J., assignor to Singer-General Precision, Inc., Little Falls, N.J., a corporation of Delaware
Filed May 24, 1967, Ser. No. 640,920
Int. Cl. G01c 19/24, 19/30, 19/52
U.S. Cl. 74—5.1                    7 Claims

ABSTRACT OF THE DISCLOSURE

A pneumatic caging apparatus for a gyro rotor having a concentric high pressure gas plenum chamber or shroud with radial jets directing gas inwardly perpendicular to the spin axis of the rotor and against its circumferential rim for both the spin-up and the desired alignment positioning of the rotor. If the rotor is narrower than the gas jet stream and the rotor is misaligned with respect to the jet, a component of the jet flows across the top or the bottom of the rotor and realigns the rotor due to the differential of static pressure on the rotor.

In the case of the gas jet stream being narrower than the width of the rotor, a V-shaped groove is inscribed at the circumferential rim of the rotor for receiving the gas jet stream therein. If in this case the rotor is misaligned with respect to the jet, that is, the center of the gas jet stream is not impinging on the center of the V-shaped groove, a net pressure force will occur and again realign the rotor in its predetermined desired aligned position.

BACKGROUND OF THE INVENTION

Field of the invention

The present invention relates generally to the caging of a gyro rotor and more particularly to a pneumatic means for caging the rotor of a gyro which uses gas jet streams directed perpendicular to the rotor's spin axis and against its circumferential rim for both the "spin-up" and the "caging" operations.

Description of the prior art

When a gyroscope is activated, it is usually desirable to orient its spin axis in a particular known direction. In the hereinbefore gyroscopes, it was customary to "cage" the rotor with three removable gas-bearing pads. This permitted the rotor to spin about its axis but constrained it to rotate in a plane determined by the three gas-bearing pads. At the "uncage" signal, the pads were withdrawn from the rotor. The disadvantages of the three-pad approach is that it is mechanically complex and requires a considerable amount of space. The caging pistons which supported the pads tended to spoil the smoothness of the surfaces near the rotor, contributing ultimately to high restraints on the rotor and errors in the gyro's performance. In addition, the pressure forces associated with the gas-bearing pads loaded the spin bearing. While these forces were usually tolerable, they could become large in some circumstances. Finally, the repeatability of the three-pad approach is not perfect. There is considerable wear and rubbing associated with this approach that ultimately results in a larger caging error or uncertainty in the position of the spin axis.

Other caging techniques used include touching the rotor on the spin axis with a probe that can be withdrawn at the uncage signal. This probe may or may not have some gas film lubrication. Another technique was to have a plane surface carrying some kind of gas bearing held near the rotor to cage it. This plane surface must be removed when the uncage signal is given. These techniques again suffer from the defects hereinbefore listed in that any means used in touching the rotor directly would produce errors in the overall system.

SUMMARY OF THE INVENTION

Therefore, an object of this invention is to provide means for eliminating the problems of complexity, surface irregularity, wear and space consumption in the caging of gyro rotors.

Another object of this invention is to provide a pneumatic caging means for a gyro rotor having highly accurate caging capability with minimum number of parts by applying the techniques of gas jet streams to fix the position of the rotor.

Another object of this invention is to provide a pneumatic caging means for caging a gyro rotor where caging may be had by applying the gas jet streams to a plane perpendicular to the spin axis whereby the loading on the spin axis bearing can be minimized.

A further object of this invention is to provide a caging means for a gyro rotor, such as gas jet streams, for correcting a caging force in combination with propelling gas jet streams for rotating the rotor whereby said propelling jets are directed to substantially the same location as the caging jets.

An additional object of this invention is to provide a pneumatic caging for a gyro rotor whereby substantially no parts are needed in the "spin-up" shroud for use in the "caging" operation of the rotor other than the radial inwardly-directed jet openings directing pressure gas from the shroud.

Other objects and many additional advantages will be more readily understood by those skilled in the art after a detailed consideration of the following specification taken with the accompanying drawings.

DESCRIPTION OF THE PREFERRED EMBODIMENTS

Figure 1:
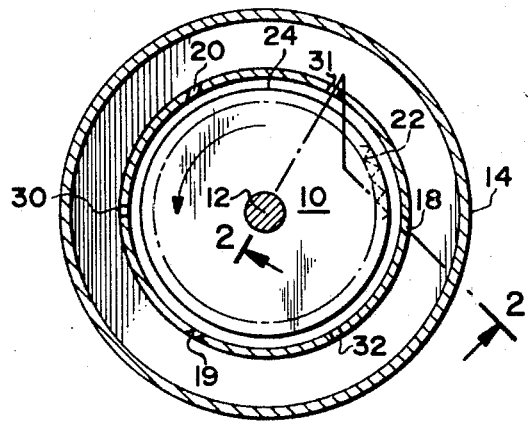
FIGURE 1 is a plan sectional view of the pneumatic caging apparatus in accordance with a preferred embodiment of the invention.
Figure 2:
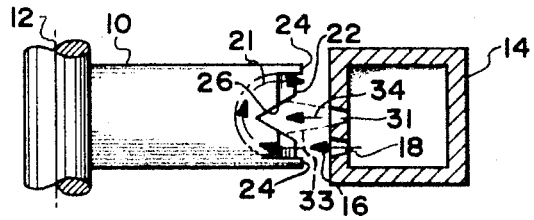
FIGURE 2 is a side-sectional view of the invention taken along line 2—2 of FIGURE 1.

Referring to FIGURES 1 and 2 of the invention, there is provided a rotor 10 rotatable about a spin axis 12 with a concentric spin-up plenum chamber or shroud 14 directing "spin-up" pressure gas streams as shown by arrow 16 through spin-up nozzles 18, 19, and 20 into a plurality of spin-up buckets 22 located circumferentially around an outer diametrical rim 24.

Circumferentially around the outer diametrical rim 24 of the rotor 10 is also provided a continuous V-shaped groove 26. That is, the center of the outer surface of the rotor 10 is encompassed by the V-shaped groove 26 while this outer surface is completely covered with the spin-up buckets 22 which are formed in a semi-circular grooved configuration in which the gas jet streams, as shown by arrow 16, from the spin-up nozzle 18 are turned around as shown by arrow 21. This causes a maximum momentum exchange between the jet streams and the rotor 10, by an action and reaction, to produce a maximum rotation.

As shown in FIGURE 1, opposite the groove 26 and diametrically opposite each spin-up nozzle 18, 19, and 20 is a plurality of small caging jet nozzles 30, 31, and 32, respectively, directing high pressure jet streams 33 in an inward direction, as shown by arrow 34, within the V-shaped groove 26. That is, when the shroud 14 is pressurized so that the rotor is spinning up, jets of gas 33 issue radially inwardly as shown by arrow 34 from the shroud 14 through the caging jet nozzles 30, 31, and 32 and engage the groove 26. It can be seen that if the center of the jet 33 does not impinge on the center of the groove 26, a net pressure force will occur. In this way, the rotor is erected to the desired aligned position.

The necessary width of the groove is easily calculated. Assume a one-inch diameter rotor with a ± five degrees of freedom within the groove. The motion of the center of the groove is ±.045 inch. Therefore, a .090 groove width could easily be captured using this technique.

Therefore, FIGURE 1 shows the plan or top view of the rotor 10 and spin-up shroud 14 wherein the spin-up nozzles 18, 19, and 20 are shown, being aligned tangentially in relation to the rotor 10, for directing "spin-up" gas jets towards the rim 24 for rotating said rotor, while the caging jets 30, 31 and 32 are shown, being aligned radially inwardly in relation to the rotor 10 for directing "caging" gas jets towards the rim of the rotor 24 for caging said rotor 10. By this method of using one high pressure shroud 14, both "spin-up" and "caging" operations are combined.

Figure 3:
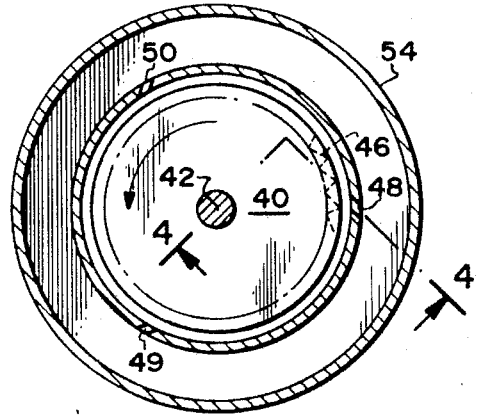
FIGURE 3 is a plan sectional view of the pneumatic caging apparatus in accordance with another embodiment of the invention.
Figure 4:
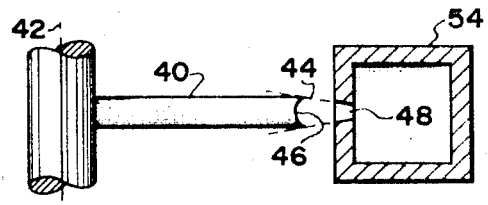
FIGURE 4 is a side-sectional view of the invention taken along the line 4—4 of FIGURE 3.

Referring to FIGURES 3 and 4 of the drawing, another embodiment of the invention provides for a caging technique in which no central groove, as groove 26, is needed. In this case a rotor 40, of a much narrower width, rotates about a spin axis 42 by means of gas jet streams 44 impinging upon a plurality of "spin-up" buckets 46. The gas jet streams 44 are directed through a plurality of high pressure "spin-up" nozzles 48, 49, and 50 which direct gas from a concentric high pressure spin-up shroud plenum chamber or 54 in the same manner as for the embodiment shown in FIGURES 1 and 2.

It should be noted now that in this embodiment of the invention, shown in FIGURES 3 and 4, the "spin-up" gas jet streams 44 are approximately the same width as the rotor 40. As shown in FIGURE 3, the jet streams 44 approach the rotor 40 tangentially. If a rotor 40 is misaligned with respect to the jets 44, a component of the gas jet streams flows across the top or the bottom of the rotor 40 for realigning the rotor 40 to its desired predetermined aligned position. That is, this flow is accompanied by a static pressure drop and the resultant force will re-erect the rotor in the desired position. It should be also noted that if the entire rotor lay clear off the jets, a Venturi effect will pull the rotor into alignment with the jets immediately.

The hereinbefore invention therefore provides for the use of gas jet streams for positioning the rotor, which rotor may or may not have a groove in its circumferential rim. In the hereinbefore systems there has been some reference in relation to gas jet streams directed along the spin axis of a rotor but failed because they directed the gas streams axially in relation ot the spin axis and in this way loaded the spin bearings. By using this invention in directing the gas jet streams perpendicularly to the spin axis, the spin bearings are not loaded. Therefore, the advantages that this type of caging for a gyro rotor has over the other caging systems are simplicity, no moving parts, and therefore no wear, no large irregularities in the surfaces near the rotor and no net loading of the spin bearing. Since the use of the concentric shroud for the spin-up is also used for the caging, it can be seen that the caging requires no additional parts to produce the caging operation herein described.

While the present invention has been described in preferred embodiments, it will be obvious to those skilled in the art that various modifications can be made therein within the scope of the invention and it is intended that the appended claims cover all such modifications.

What is claimed is:

1. A pneumatic caging for a gyro rotor, said rotor having a circumferential rim comprising, a concentric high pressure gas shroud having a plurality of radial jet caging nozzles directing gas jet streams radially inwardly against the rotor's circumferential rim and substantially perpendicular to the rotor's spin axis for engaging the rotor and capturing it for rotation in a desired aligned position, whereby when the rotor is misaligned with respect to the jet streams, components of the jet streams flow on said rotor rim for realigning the rotor.

2. The structure of claim 1, further comprising caging means located on the circumferential rim of said rotor for receiving the jet streams and cooperating therewith for the desired alignment of said rotor.

3. The structure of claim 1, wherein said rotor rim includes a plurality of spin-up buckets and said concentric shroud includes a plurality of spin-up nozzles extending tangentially to the rotor for directing gas jet streams on said spin-up buckets for rotation of said rotor.

4. The structure of claim 3, wherein the spin-up nozzles produce gas jet streams having a width relative to the width of said rotor rim for directing a jet of gas across both sides of the rotor rim and thereby producing components of jet flow on the sides of the rotor rim, whereby when the rotor is misaligned with respect to the gas jet streams, a differential static pressure is produced to align the rotor at its predetermined desired alignment.

5. The structure of claim 1, wherein the circumferential rim of said rotor includes a plurality of spin-up buckets, and said concentric shroud includes three spin-up nozzles equally spaced on its inside diametrical surface, extending tangentially to the rotor rim for directing three equally spaced spin-up gas jet streams for rotating said rotor and said jet streams being of substantially the same width as said rotor rim for presenting jet flows across the sides of the rotor rim, accompanied therewith by static pressures, and resulting in a force for re-erecting the rotor when said rotor is misaligned.

6. The structure of claim 1, wherein the circumferential rim of said rotor includes a groove around its perimeter and said caging nozzles directing gas jet streams radially inwardly against said rotor's circumferential rim, whereby when the center of the jet streams do not impinge on the center of the groove, a net pressure force will occur for erecting said rotor in a desired aligned position.

7. The structure of claim 1, wherein the circumferential rim of said rotor includes a plurality of spin-up buckets, and a V-shaped groove extending circumferentially of said rotor rim, and said shroud, includes a plurality of spin-up nozzles directing spin-up gas jet streams in a tangential direction towards said rotor rim for rotating said rotor, and a plurality of caging jet nozzles extending equally spaced on the inside diametrical surface of said shroud and diametrically opposite each of said spin-up nozzles for directing caging gas jet streams continuously inwardly against the V-shaped groove, whereby when the center of the caging jet streams do not impinge on the center of the groove, a net pressure force will occur to realign the rotor in the desired position.

References Cited

UNITED STATES PATENTS

| 2,011,738 | 8/1935 | Urfer | 74—5.43 |
| 2,174,777 | 10/1939 | Carter et al. | 74—5.43 |
| 2,247,288 | 6/1941 | Delsuc | 74—5.43 |
| 2,248,141 | 7/1941 | Von Manteuffel | 74—5.43 |
| 2,307,788 | 1/1943 | Nisbet et al. | 74—5.43 |
| 2,324,157 | 7/1943 | Heintz | 74—5.43 XR |
| 3,020,769 | 2/1962 | Bentley et al. | 74—5.1 |

C. J. HUSAR, Primary Examiner

U.S. Cl. X.R.

74—5.43